United States Patent [19]

Meeder

[11] 4,354,841
[45] Oct. 19, 1982

[54] PRERECORDED INSTRUCTIONAL MATERIAL AND METHOD OF INSTRUCTION

[75] Inventor: Ernest P. Meeder, Glen Ellyn, Ill.

[73] Assignee: C. F. Distributions, Inc., Glen Ellyn, Ill.

[21] Appl. No.: 191,835

[22] Filed: Sep. 29, 1980

[51] Int. Cl.³ ............................ G09B 5/04; G11B 5/02
[52] U.S. Cl. .................................... 434/157; 434/319
[58] Field of Search .............. 434/157, 319, 320, 321, 434/219

[56] References Cited

U.S. PATENT DOCUMENTS

| 2,777,901 | 1/1957 | Dostert | 434/157 |
| 3,294,924 | 12/1966 | Fein | 434/219 X |
| 4,139,954 | 2/1979 | Yamamoto | 434/157 |

OTHER PUBLICATIONS

"Suggestopaedia: A New Training Technique" *Educational Technology*, Jun. 1978, pp. 5–8.

Primary Examiner—William H. Grieb
Attorney, Agent, or Firm—Wegner, McCord, Wood & Dalton

[57] ABSTRACT

A prerecorded magnetic audio tape, and method of instruction utilizing the tape, are disclosed wherein at least two series of associated recorded phrases are recorded on separate tape tracks of a multi-track tape. The phrases in each series are separated by intermediate sections and the phrases of each series are staggered in the longitudinal direction of tape advance such that the phrases of one series alternate with the phrases of the other series, without overlap. At least a third track is recorded with continuous background sounds, the subject matter of which is substantitively related to the subject matter of the recorded phrases so as to enhance listener interest and learning effectiveness.

8 Claims, 2 Drawing Figures

PRERECORDED INSTRUCTIONAL MATERIAL AND METHOD OF INSTRUCTION

BACKGROUND OF THE INVENTION

1. Field of the Invention

This invention relates to prerecorded instructional materials and methods of instruction and, more particularly, this invention relates to a prerecorded magnetic tape and a method of use for instructional purposes.

2. Description of the Prior Art

The use of prerecorded materials in teaching is well known. Such materials are useful in programmed learning, the teaching of dialog conversation, and in foreign language instruction, for example.

Prior prerecorded materials useful in language teaching, for example, are exemplified by Dostert U.S. Pat. No. 2,777,901 issued Jan. 5, 1957 and Yamamoto U.S. Pat. No. 4,139,954 issued Feb. 20, 1979. Each of these prior patents discloses a method of teaching a foreign language wherein a recorded phrase in a first language is followed by an equivalent recorded phrase in a second language.

Dostert U.S. Pat. No. 2,777,901 discloses that the intensity of alternate phrases are received by respective earphones can be regulated in order to emphasize one language relative to another, and that the series of phrases may be recorded on respective tracks of a two track magnetic tape.

Yamamoto U.S. Pat. No. 4,139,954 discloses a magnetic tape having at least one pair of two adjacent tracks with prerecorded spoken phrases in different languages on respective tracks, with intermediate sections between phrases on each track. The phrases on one track are staggered with respect to phrases on an adjacent track.

The intermediate sections between recorded phrases may contain recorded background sounds, such as music, in order to mask undesirable low volume sounds magnetically induced from the recorded sections of an adjacent track. The structure of the type of prior magnetic tape disclosed in the Yamamoto patent is described below in connection with FIG. 1.

Heretofore there has not been available a prerecorded instructional material utilizing two or more series of staggered but related recorded phrases and continuous low volume background sounds whose subject matter is substantively related to that of the phrases in order to enhance the listener's interest and the learing process. Further, prior types of prerecorded instructional material, such as shown in the Yamamoto patent, were limited in the type of playback equipment usable with the tape. Also, instructional tapes having background sounds where volume is independently controllable relative to the volume of the recorded phrases have not been available.

SUMMARY OF THE INVENTION

It is an object of the present invention to overcome one or more of the problems described above.

According to the invention, a prerecorded magnetic tape and method of instruction utilizing such a tape is provided wherein at least two substantively related series of longitudinally spaced phrases are recorded on respective tracks of a multi-track tape. The phrases of each track are separated by intermediate sections with the phrases of one track being aligned with intermediate sections of the other track, without overlap of related phrases transversely across the tape.

At least one additional track of the tape is prerecorded with continuous background sounds. Preferably, the background sounds are synchronously recorded on two adjacent tracks which are disposed between the two prerecorded phrase tracks. Preferably, the first phrase track is reproducible with one background track and the second phrase track is reproducible with a second background track. The volumes of the first and second phrase tracks are thus adjustable relative to each other with no diminution of background level heard by the listener.

The association by the listener of each series of phrases with the background sounds leads the listener to associate the phrases with each other, thus enhancing the learning effect obtainable with the tape. Further, the background sounds or music may be selected so as to be directed to a particular class of listener so as to hold a given type of listener's interest.

The tape is useful on standard monaural or stereo tape players.

Other objects and advantages will become apparent from the following detailed description taken in conjunction with the accompanying drawings.

DETAILED DESCRIPTION OF THE PREFERRED EMBODIMENT

Figure 1:
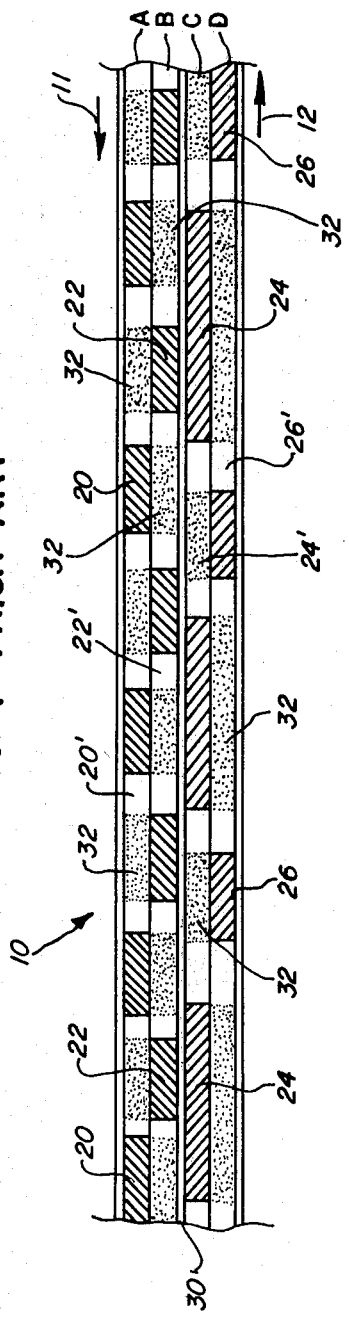
FIG. 1 is a schematic view of a prerecorded magnetic audio tape showing a prerecorded phrase/background sound pattern such as utilized by the prior art.

Referring to FIG. 1, a prior art prerecorder magnetic audio tape 10 as disclosed in Yamamoto U.S. Pat. No. 4,139,954 (Feb. 20, 1979) is shown. The tape of FIG. 1 corresponds to that of Yamamoto FIG. 4.

The prior art tape comprises a plurality of longitudinally extending tracks A–D. As indicated by the arrows 11 and 12, the tape is adapted to travel in either of two opposite directions. This is conventionally effected by reversing the position of the cassette or other means holding the tape 10.

Recorded on each track A–D is a respective series of prerecorded sections 20, 22, 24 and 26. Each section 20 is substantively associated with a section 22 and each section 24 is substantively associated with a section 26, as described below. The associated pairs of sections 20, 22 and 24, 26 are staggered with respect to each other with intermediate sections 20'–26' separating longitudinally spaced sections 20–26, respectively, such that there is no overlap between associated pairs of prerecorded sections.

For purposes discussed below, tracks A and B are operatively associated with each other, as are tracks C and D. Associated pairs A, B and C, D are separated by a longitudinally extending spacing strip 30. Only one pair of tracks A, B or C, D are reproducible at one time.

Each prerecorded section 20 (or 26), for example, comprises a phrase of a first language, illustratively a foreign language. Each associated section 22 (or 24) comprises an associated equivalent phrase in a second or known language. Thus, a listener hears a foreign language phrase 20 followed by a known language equivalent phrase 22.

Recorded on each intermediate section 20'-26' are a series of background sounds 32, such as music, for example. The background sounds 32 are recorded at a low level in order to mask undesirable sounds which may be magnetically induced from an adjacent track. No magnetic induction across the strip 30 is possible.

The background sounds 32 are present only in the intermediate sections 20'-26', and may be recorded along the entire length thereof, or only opposite recorded sections of an adjacent track, as shown in FIG. 1.

The tape of FIG. 1 is typically mounted in a cassette or equivalent means and is reproducible only on a tape player capable of reproducing only the pairs of tracks A, B or C, D simultaneously, as by a split head having separate volume controls for respective speakers.

The tape of FIG. 1 is not capable of being meaningfully reproduced on prior monaural reproduction equipment which reproduces all tracks of a tape simultaneously, since the subject matter of tracks C-D is not related to that of tracks A-B, and are intended to be reproduced separately thereof.

Figure 2:
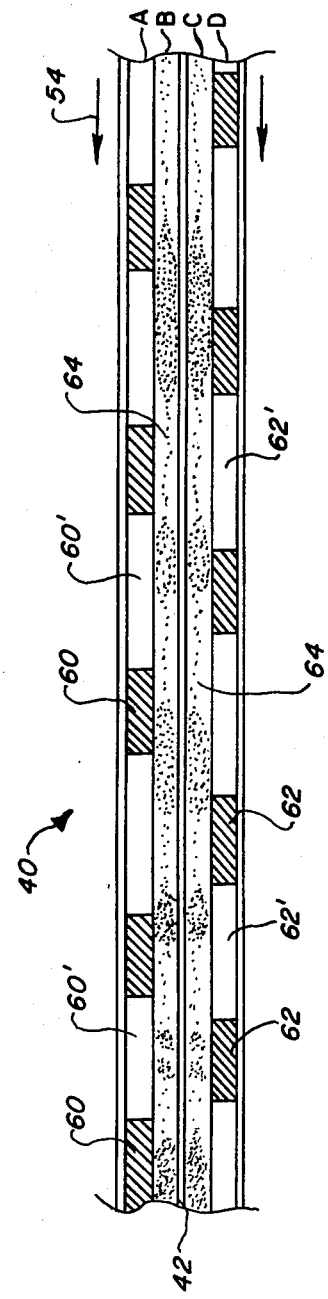
FIG. 2 is a schematic view of a prerecorded magnetic audio tape made in accordance with the present invention.

Referring now to FIG. 2, a prerecorded magnetic tape, generally designated 40, according to the present invention, is shown. The tape 40 comprises four longitudinally extending tracks A, B, C and D, with an intermediate longitudinally extending strip 42 separating respective pairs of tracks A-B and C-D. No magnetic induction across strip 42 is possible. The tape is intended to travel in the direction of the arrow 54.

The tape 40 of FIG. 2 is a commercially available tape, such as marketed by the Ampex Corporation under the product designation "Type 406".

A first series of staggered prerecorded sections 60 is recorded on track A, with a second, associated series of prerecorded sections 62 recorded on track D. Each track B and C, disposed between tracks A and D, is recorded with continuous background sounds 64.

Adjacent sections 60 are separated by intermediate unrecorded sections 60', and adjacent sections 62 are separated by unrecorded intermediate sections 62'. The sections 60 and 62 are staggered such that there is no transverse overlapping thereof, with the length of each section 60, 62 contained wholly within the length of a respective intermediate section 62', 60'.

As in FIG. 1, the prerecorded sections 60 comprise a series of phrases, such as foreign language phrases or portions of a dialog, for example, substantively associated with the recorded sections 62 on track D. For example, phrases 60 may comprise phrases of a foreign language dialog while phrases 62 comprise a known language equivalent of each phrase 60.

The tracks B and C are recorded with a continuous series of synchronous background sounds 64. The background sounds comprise music or sounds otherwise substantively associated with the subject matter of the sections 60, 62.

The tape 40 is susceptible to reproduction on either monaural units which reproduce tracks A, B, C and D simultaneously, or on stereo units which reproduce respective pairs of tracks A-B and C-D on separate speakers so that adjustment of the relative volumes of respective pairs A, B and C, D is possible.

Thus, a listener may selectively adjust the volume of one pair of tracks, such as A, B to emphasize the language or dialog portion of track A relative to the phrase of track D. Due to the synchronous recording of background sounds on the tracks B and C, there is no diminution in background sound volume perceived by the listener. The background sounds are heard throughout the dialog.

The subject matter of the background sounds 64 is preferably selected to be substantively associated with the dialog or foreign language phrases of tracks A and D. For example, a series of foreign language phrases 60 such as typically spoken by a traveler in a foreign country may be associated with background sounds 64 comprising railway, airport or street sounds such as would be associated with the traveler's experiences.

Alternatively, the background sounds 64 may comprise music directed to a specific class of listeners, with the effect of capturing and maintaining a given type of listener's interest throughout a learning session.

By use of the tape 40 of FIG. 2, a listener associates the background sound with the foreign language phrases 60, and with the known language phrases 62 and thus tends to associate the foreign and known language phrases with each other, thus enhancing the learning effect.

It will be appreciated that obvious modifications of the tape 40 of FIG. 2 fall within the scope of the invention, provided that at least one phrase track, such as A or D in FIG. 2, is associated with a track such as B or C of continuous background sounds.

For example, with reference to the track designations of FIG. 2 of the tape 40, the following pairs of tracks may be background tracks, with the remaining tracks being phrase tracks: B and D, A and D or A and C.

In a less preferred form of the tape 40, only a single track is recorded with background sounds.

Using the tape 40 of FIG. 2, a teacher may perform a method of instruction which comprises the steps of providing staggered recorded phrases of known and foreign languages to a listener simultaneously with background sounds whose subject matter is associated with the subject matter of the phrases. The intensity of the background sounds may be maintained at a constant level regardless of the selectively diminished intensity of one series of phrases so as to emphasize the other series of phrases.

The foregoing detailed description is provided for clearness of understanding only, and no unnecessary limitations are to be inferred therefrom, as modifications will be obvious to those skilled in the art.

I claim:

1. A magnetic audio tape employable as a learning aid, said tape comprising:
   a plurality of tracks extending longitudinally in a direction of advancement of the tape;
   each of first and second tracks including longitudinally spaced prerecorded sections separated by intermediate sections;
   said prerecorded sections of said first and second tracks being staggered with respect to each other in said direction of advancement, such that all of said prerecorded sections of said first track are entirely out of alignment with all of said prerecorded sections of said second track, taken transversely of said direction of advancement;
   said prerecorded sections having thereon recorded sounds, the recorded sound of each section on said first track being related as a learning aid to the next succeeding recorded sound on said second track, taken in said direction of advancement; and
   background sounds recorded along the entire length of at least a third said track being substantively related to the subject matter of said prerecorded sections so that the phrases of each section are associated with the background sounds, and thus with each other, by a listener, so as to enhance the learning effect and interest of the listener.

2. The tape of claim 1 wherein said background sound are recorded along the entire length of an additional, fourth said track.

3. The tape of claim 2 wherein said background sounds are synchronously recorded on said first and fourth tracks, said third and fourth tracks being adjacent each other and between said first and second tracks.

4. The tape of claim 3 wherein said tape is adapted for simultaneous reproduction of a first pair of tracks comprising said first and third tracks in a first speaker and simultaneous reproduction of a second pair of tracks comprising said second and fourth tracks in a second speaker with the relative volumes of said first and second pairs being selectively adjustable for selective emphasis of one of said first and second tracks without diminution of said background sounds.

5. The tape of claim 1 wherein said intermediate sections of said first and second tracks are unrecorded.

6. A method of instruction, comprising the steps of:
(a) providing recordings of at least first and second series of related phrases, the phrases within each said series being separated by intermediate sections, the phrases of each said series alternating with phrases of the other said series without overlapping;
(b) providing continuous recorded background sounds which are substantively related to the subject matter of both series of phrases; and
(c) simultaneously delivering to a listener reproductions of each said series of recorded phrases and said continuous background sounds, said background sounds being reproduced simultaneously with said phrases and during the intermediate sections between said phrases, whereby the subject matter of each series of phrases is associated by the listener with the background sounds and with the other series of phrases so as to enhance the listener's interest and the effectiveness of the teaching.

7. The method of claim 6 wherein first and second series of synchronous background sounds are provided, said first series of background sounds being associated with said first series of phrases, said first series of background sounds and first series of phrases comprising a first track pair, and said second series of background sounds being associated with said second series of phrases, said second series of background sounds and second series of phrases comprising a second track pair, each said first and second track pair being related and reproducible independently of the other track pair at selectively adjustable relative volumes, whereby emphasis may be placed on one said series of phrases without diminution of the volume of said background sounds heard by the listener.

8. A magnetic audio tape employable as a learning aid, said tape comprising:
at least four tracks extending longitudinally in a direction of advancement of the tape;
first and second of said tracks each including longitudinally spaced prerecorded sections separated by intermediate unrecorded sections;
said prerecorded sections of said first and second tracks being staggered with respect to each other in said direction of advancement, such that all said prerecorded sections of said first track are entirely out of alignment with all of said prerecorded sections of said second track, taken transversely of said direction of advancement;
said prerecorded sections having thereon recorded sounds, the recorded sound of each section on said first track being related as a learning aid to the next succeeding recorded sound on said second track, taken in the direction of advancement;
a third and fourth said tracks adjacent each other and between said first and second tracks, said third and fourth tracks having background sounds synchronously recorded along their entire length, said background sounds being substantively related to the subject matter of the first and second tracks, so that the listener associates the phrases of each section with the background sounds, which leads the listener to associate the phrases with each other and thereby enhances the learning effect and interest of the listener; and
a longitudinally extending strip between said third and fourth tracks, said strip preventing magnetic induction between the adjacent third and fourth tracks.

* * * * *